US011668274B2

(12) United States Patent
Taubenrauch et al.

(10) Patent No.: US 11,668,274 B2
(45) Date of Patent: Jun. 6, 2023

(54) NACELLE HAVING LIQUID RETAINING PROPERTIES

(71) Applicant: ADWEN GMBH, Bremerhaven (DE)

(72) Inventors: Elmar Taubenrauch, Wurster Nordseeküste (DE); Dror Avner, Berlin (DE)

(73) Assignee: ADWEN GMBH

( * ) Notice: Subject to any disclaimer, the term of this patent is extended or adjusted under 35 U.S.C. 154(b) by 653 days.

(21) Appl. No.: 16/489,490

(22) PCT Filed: Mar. 7, 2018

(86) PCT No.: PCT/EP2018/055666
§ 371 (c)(1),
(2) Date: Aug. 28, 2019

(87) PCT Pub. No.: WO2018/162592
PCT Pub. Date: Sep. 13, 2018

(65) Prior Publication Data
US 2020/0072184 A1 Mar. 5, 2020

(30) Foreign Application Priority Data

Mar. 7, 2017 (EP) .................................... 17159685

(51) Int. Cl.
*F03D 80/00* (2016.01)
*F03D 1/00* (2006.01)
(Continued)

(52) U.S. Cl.
CPC ............... *F03D 1/00* (2013.01); *F03D 80/00* (2016.05); *F05B 2230/61* (2013.01);
(Continued)

(58) Field of Classification Search
CPC ........ F03D 1/00; F03D 80/00; F05B 2230/61; F05B 2240/14; F05B 2240/57;
(Continued)

(56) References Cited

U.S. PATENT DOCUMENTS 8,262,347 B2 * 9/2012 Wallace .................. F03D 80/70
290/55
8,734,117 B2 * 5/2014 Munk-Hansen ...... F16N 31/004
416/244 A
(Continued)

FOREIGN PATENT DOCUMENTS

CN 2197307 Y 5/1995
CN 1721270 A 1/2006
(Continued)

OTHER PUBLICATIONS

International Search Report dated Jun. 6, 2018 for Application No. PCT/EP2018/055666.
(Continued)

*Primary Examiner* — Brian P Wolcott
(74) *Attorney, Agent, or Firm* — Schmeiser, Olsen & Watts LLP

(57) ABSTRACT

Provided is a nacelle for a wind driven power plant, the nacelle including a nacelle bottom cover, wherein the nacelle bottom cover includes two or more segments, each of the segments being configured to contain a respective predefined maximum volume of a liquid in a receptacle in a case of leakage, and wherein the respective receptacles are configured to collectively contain a total volume that corresponds to a total amount of liquids in the wind driven power plant, in particular a total amount of lubricating oils and/or cooling liquids in the wind driven power plant. Also
(Continued)

provided is a wind driven power plant including the nacelle and a wind park including a plurality of the wind driven power plants.

8 Claims, 11 Drawing Sheets

(51) Int. Cl.
*F16B 5/02* (2006.01)
*F16B 37/06* (2006.01)

(52) U.S. Cl.
CPC ....... *F05B 2240/14* (2013.01); *F05B 2240/57* (2013.01); *F05B 2260/602* (2013.01); *F05B 2260/603* (2013.01); *F05B 2280/6003* (2013.01); *F16B 5/02* (2013.01); *F16B 37/067* (2013.01)

(58) Field of Classification Search
CPC .......... F05B 2260/602; F05B 2260/603; F05B 2280/6003; F16B 5/02; F16B 37/067; F16B 37/065
See application file for complete search history.

(56) References Cited

U.S. PATENT DOCUMENTS

| | | | | |
|---|---|---|---|---|
| 9,677,543 | B2* | 6/2017 | Kamibayashi | ........... F03D 80/00 |
| 11,231,018 | B2* | 1/2022 | Staghøj | ................... F03D 80/88 |
| 2011/0247710 | A1 | 10/2011 | Siegfriedsen | |
| 2012/0224963 | A1 | 9/2012 | Munk-Hansen | |
| 2015/0300323 | A1* | 10/2015 | Neumann | ............... F03D 80/00 415/168.1 |
| 2016/0312825 | A1 | 10/2016 | Pischel | |
| 2020/0332778 | A1* | 10/2020 | Vellore Babu | ............ F03D 9/25 |
| 2021/0079898 | A1* | 3/2021 | Vcelka | .................... F03D 80/60 |

FOREIGN PATENT DOCUMENTS

| | | | | | |
|---|---|---|---|---|---|
| CN | 201474848 | U | | 5/2010 | |
| CN | 201687669 | U | * | 12/2010 | |
| CN | 201687669 | U | | 12/2010 | |
| CN | 102209849 | A | | 10/2011 | |
| CN | 102667147 | A | | 9/2012 | |
| CN | 202484301 | U | | 10/2012 | |
| CN | 203742902 | U | | 7/2014 | |
| CN | 204572353 | U | | 8/2015 | |
| CN | 204572353 | U | * | 8/2015 | |
| CN | 204596058 | U | | 8/2015 | |
| CN | 106164509 | A | | 11/2016 | |
| DE | 102005032627 | B3 | * | 8/2006 | ............. F03D 80/00 |
| EP | 2829726 | A1 | | 1/2015 | |
| EP | 2942522 | A1 | * | 11/2015 | ............. F03D 80/00 |
| EP | 2942522 | A1 | | 11/2015 | |
| EP | 2947315 | A1 | * | 11/2015 | ............. F03D 80/00 |
| EP | 2947315 | A1 | | 11/2015 | |
| EP | 2949986 | A1 | | 12/2015 | |
| EP | 3002456 | A1 | | 4/2016 | |
| EP | 3904669 | A1 | * | 11/2021 | ............. F03D 80/70 |
| JP | 2021102948 | A | * | 7/2021 | |
| WO | 2009132671 | A1 | | 11/2009 | |
| WO | WO2009132671 | A2 | | 11/2009 | |
| WO | WO-2013087074 | A1 | * | 6/2013 | ............. F03D 11/00 |
| WO | WO-2014091617 | A1 | * | 6/2014 | ............ F03D 7/0204 |

OTHER PUBLICATIONS

Written Opinion dated Jun. 6, 2018 for Application No. PCT/EP2018/055666.
Shang, Zhang: "Analysis of Wind Turbine Gearbox Oil Temperature High Reason and Heat Dissipation Scheme"; Science and Technology & Innovation; pp. 36-37; DOI : 10.15913/j.cnki.kjycx.2015.18.036; 2015.
Chinese Office Action dated Sep. 14, 2021 for Application No. 201880016725.6.

* cited by examiner

NACELLE HAVING LIQUID RETAINING PROPERTIES

CROSS-REFERENCE TO RELATED APPLICATIONS

This application claims priority to PCT Application No. PCT/EP2018/055666, having a filing date of Mar. 7, 2018, which is based on European Application No. 17159685.1, having a filing date of Mar. 7, 2017, the entire contents both of which are hereby incorporated by reference.

FIELD OF TECHNOLOGY

The following relates to a nacelle for a wind driven power plant.

BACKGROUND

Wind is one of the most important renewable energy technologies. Wind turbines (also referred to as a wind driven power plants, wind turbine generators, or wind energy converters) are more and more arranged in large-scale offshore wind parks. There are many technical challenges relating to these offshore wind parks, as for example the assembly of parts and the transport, the erection of the wind turbine in the sea and the maintenance of the wind driven power plants.

WO 2009/132671 A2 discloses a wind energy installation comprising a nacelle with a paneling cover surface.

Wind driven power plants comprise large amounts of liquids, particularly in the cooling and/or lubrication systems. The total amount/volume of liquids depends on the size and configuration of the wind driven power plant. In geared wind driven power plants having a power rating of 5 MW (Megawatt) or more, the total amount of liquids can be well above 2000 Liters.

Present wind driven power plants often have insufficient or no liquid retainment properties. Some wind driven power plants also require energy-driven drainage pumps to convey leaking liquids into a (sufficiently large) collecting tank.

Especially for offshore wind power plants, however, a reliable containment of leaking liquids is crucial (and sometimes even required by law) to prevent a pollution of the environment.

SUMMARY

An aspect relates to an improved nacelle of a wind driven power plant, the nacelle having liquid retainment properties.

Basically, a leakage of liquids can start at a tank or at any other malfunctioning component of the wind driven power plant which carries and/or contains liquids.

Furthermore, the available and suitable space for a collection container in a geared wind driven power plant is limited.

Embodiments of the present invention provide an improved nacelle for a wind driven power plant. The nacelle comprises a nacelle bottom cover. The nacelle bottom cover comprises two or more segments. Each of the segments is configured to contain in the case of leakage a predefined maximum volume of a leaking liquid in a receptacle. The respective receptacles are configured to collectively contain a total volume that corresponds to a total amount of liquids in the wind driven power plant. Particularly, the total amount of liquids can comprise a total amount of lubricating oils and/or cooling liquids in the wind driven power plant.

This aspect provides that liquid cannot escape away from the nacelle or pour into the tower. Even in a worst-case scenario, the full estimated amount of liquid can be contained. For an 8 MW rated geared power plant, this amounts to approximately 2420 liters.

According to an advantageous aspect, a first segment can be arranged adjacent to a second segment. The first segment and the second segment can be coupled by a channel that is configured to distribute the leaking liquid from the first segment to the second segment, in case the amount of leaking liquid in the first segment exceeds the predefined volume of the first segment.

The leaking liquid is contained in a limited area and will continue to the next reserved area depending on the amount of liquid and the leakage starting point.

According to another advantageous aspect, the two or more segments can each comprise a lower surface and a circumferential upraised surface that surrounds the lower surface. The lower surface and the circumferential upraised surface can cooperatively form a receptacle. A section of the circumferential upraised surface can form the channel. A bottom of the channel may have a lower vertical height than the remainder of the circumferential upraised surface. The vertical height of the bottom of the channel can define a maximum fill-level of the receptacle. This aspect provides a passive and reliable solution for controlling the flow path and area of contamination.

According to another advantageous aspect, the nacelle bottom cover can comprise a third segment. At least the second segment can comprise a first and a second channel. The first channel can be coupled to the first segment. The second channel can be coupled to the third segment. The channel bottom of the second channel can have a lower vertical height than the channel bottom of the first channel.

A plurality of panels can form the nacelle bottom cover. The panels can respectively comprise one or more of the segments. Adjacent segments can be coupled by channels such that they are consecutively filled one after the other with the leaking liquid.

This aspect limits the area for clean-up. Additionally, in a case of a full volume leak (the wind driven power plant losing all of its liquids through leakage) the resulting load will be distributed between several nacelle bottom cover segments, avoiding local over loading of the structure.

According to another advantageous aspect, the panels can each comprise a flange to form an overlapping flange connection with at least one adjacent panel. The respective circumferential upraised surface of the panel can form at least a part of the respective flange.

The flanges can be integral to the panels. The flanges advantageously extend in the same plane as the panel to which it belongs. Flanges of curved panels may accordingly extend in a direction substantially tangential to the curve, i.e. continue in the direction of (overall) extension in the region of the panel adjacent to the flange.

Advantageously, the flange connection can comprise reinforcing flattened steel bars or similar profiled metal bars, which can be arranged along the flanges, thereby becoming a part of the flange connection. The steel bars can be arranged on the inside and/or on the outside of the nacelle. The reinforced flange connection allows for a simple and robust construction of the nacelle cover.

This aspect reduces the size of the nacelle cover parts and simplifies transport and installation of the wind driven power plant. Furthermore, this aspect evades angular deviations inherent to the inwardly directed flanges as known from the known art, which have to be perpendicular to the main plane of extension. It therefore improves manufacturability, mountability, sealability and tolerance control of the composite panels.

According to another advantageous aspect, the panels can be configured such that—in a predefined mounting condition—a flange gap between two overlapping flanges of a flange connection is positioned above maximum fill-levels of one or more receptacles adjacent to the (intermediate) flange connection. Advantageously, the flange gap can be sealed by a seal/gasket.

According to another advantageous aspect, one or more of the panels can form a raised collar that surrounds an opening in the nacelle bottom cover. In particular, the opening can be a tower opening or a hatch opening. Advantageously, the raised collar may raise above the maximum fill-level of the receptacles. These aspects improve the leak tightness of the nacelle bottom cover.

According to another advantageous aspect, the liquid containment segments or panels comprising the liquid containment segments can be manufactured as one-shot composite reinforced laminates.

The composite can be a fiber reinforced polymer. The fiber reinforced polymer can be a glass fiber reinforced polymer (GFRP). A glass fiber reinforced polymer, also known as "Fiberglass" or "fiberglass" is a type of fiber-reinforced plastic where the reinforcement fiber is specifically glass fiber. The glass fiber may be randomly arranged, flattened into a sheet (called a chopped strand mat), or woven into a fabric. Alternatively, the fibers of a layer of the composite may be unidirectionally aligned. The polymer matrix may be a thermoset polymer matrix, most often based on thermosetting polymers such as epoxy, polyester resin, or vinylester, or a thermoplastic. The glass fibers are made of various types of glass depending upon the fiberglass use. These glasses all contain silica or silicate, with varying amounts of oxides of calcium, magnesium, and sometimes boron. Other common names for fiberglass are glass-reinforced plastic (GRP), glass-fiber reinforced plastic (GFRP) or GFK (from German: Glasfaserverstärkter Kunststoff). Because glass fiber itself is sometimes referred to as "fiberglass", the composite is also called "fiberglass reinforced plastic." The present description also uses the term "composite" for GFRP or GRP. This aspect reduces the overall weight of the nacelle.

Advantageously, some or all segments (or rather the panels comprising the segments) can have a sandwich structure. The sandwich structure can comprise a fiber reinforced top layer and a fiber reinforced bottom layer and an intermediate foam core. Sandwich structures improve the rigidity/stiffness of the nacelle cover.

Advantageously, flange regions and/or collar regions of the segments/panels can comprise a single skin laminate. This aspect improves the robustness of the flange connection.

According to another advantageous aspect, panels of the nacelle bottom cover can be connected to each other by means of overlapping flanges, which are integral to the panels. The flanges advantageously extend in the same plane as the panel to which it belongs. Flanges of curved panels may accordingly extend in a direction substantially tangential to the curve, i.e. continue in the direction of (overall) extension in the region of the panel adjacent to the flange. In other words, the respective flange extends straightly (not bent or curved) from the panel.

Split lines (of the flange connections) between at least some, or a majority of the panels of the nacelle cover can extend in flat planes perpendicular to the surface of the panels. Advantageously, the flat planes of crossing split lines can be perpendicular to each other. The flat planes of parallel split lines can be parallel. In particular, the split lines between the lateral panels (on the lateral side of the nacelle cover) can be substantially straight in a top view on the respective side and either extend in parallel to each other or extend perpendicular to each other. There can, for example be at least three parallel horizontal split lines within one lateral side of the nacelle cover which extend in horizontal flat planes and the horizontal flat planes are parallel to each other. There can further be at least two or three vertical split lines which extend in vertical flat planes and the vertical flat planes are parallel to each other. The vertical flat planes and the horizontal flat planes are perpendicular to each other.

Advantageously, the arrangement of the flanges (and the panels) can be based on a high-point drainage concept. Accordingly, the flange of a higher panel overlaps the flange of a lower complementary panel of a flange connection on an outer side of the nacelle cover in a downward direction. This aspect exploits gravitational forces such that a water flow (e.g. caused by rain) is directed away from the split line (of the flange connection).

Advantageously, the flange connection can comprise reinforcing angular ("L"-shaped) beams or similar profiled metal bars, which can be arranged along the flanges, thereby becoming a part of the flange connection. The reinforced flange connection allows for a simple and robust construction of the nacelle cover.

According to another advantageous aspect, the nacelle cover comprises at least two different flange connections, dependent on the fitting conditions and whether the flange connections are configured to be detachable flange connections or permanent flange connections. A first flange connection may comprise a rivet/clinch nut and a bolt. A second flange connection may comprise a clinch bolt and a normal nut. A first flange connection may comprise two metal bars on opposite sides of the flanges. A second flange connection may comprise only one metal bar on one side of the flange connection.

At least one of the panels of a flange connection may comprise a drip edge adjacent to the flange connection.

At least one of the flange connections may be located in an indentation with respect to a surrounding surface of the adjacent panels. This kind of flange connection may advantageously be used at the bottom of a nacelle. The flange connection does then have greater altitude (level, height) than the surrounding panels which improves water tightness.

The metal bars of the flanges can (collectively) be arranged and conductively interconnected such that they form a faraday cage to provide a lightning protection of the drive train and other components.

The flange connections may be configured to constitute a substantially maintenance free connection, having an expected/calculated lifetime of approximately twenty-five years.

The following also provides a wind driven power plant comprising the nacelle according to aspects and embodiments of the invention The following also provides a wind park comprising a plurality of wind driven power plants according to aspects and embodiments of the invention.

The following further provides a method of manufacturing and assembling a nacelle according to aspects and embodiments of the invention.

BRIEF DESCRIPTION

Some of the embodiments will be described in detail, with references to the following Figures, wherein like designations denote like members, wherein.

Figure 8:
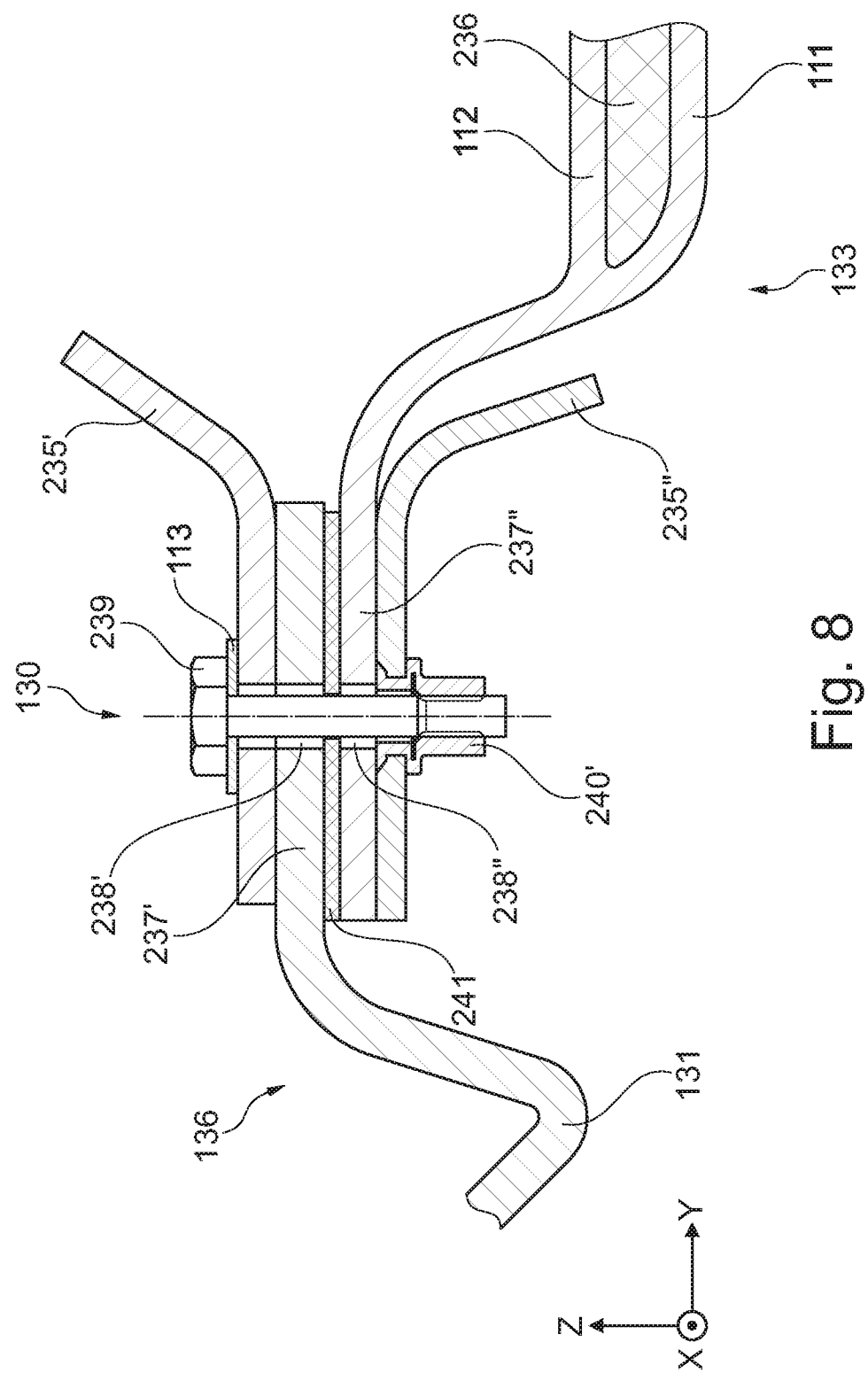
Figure 9:
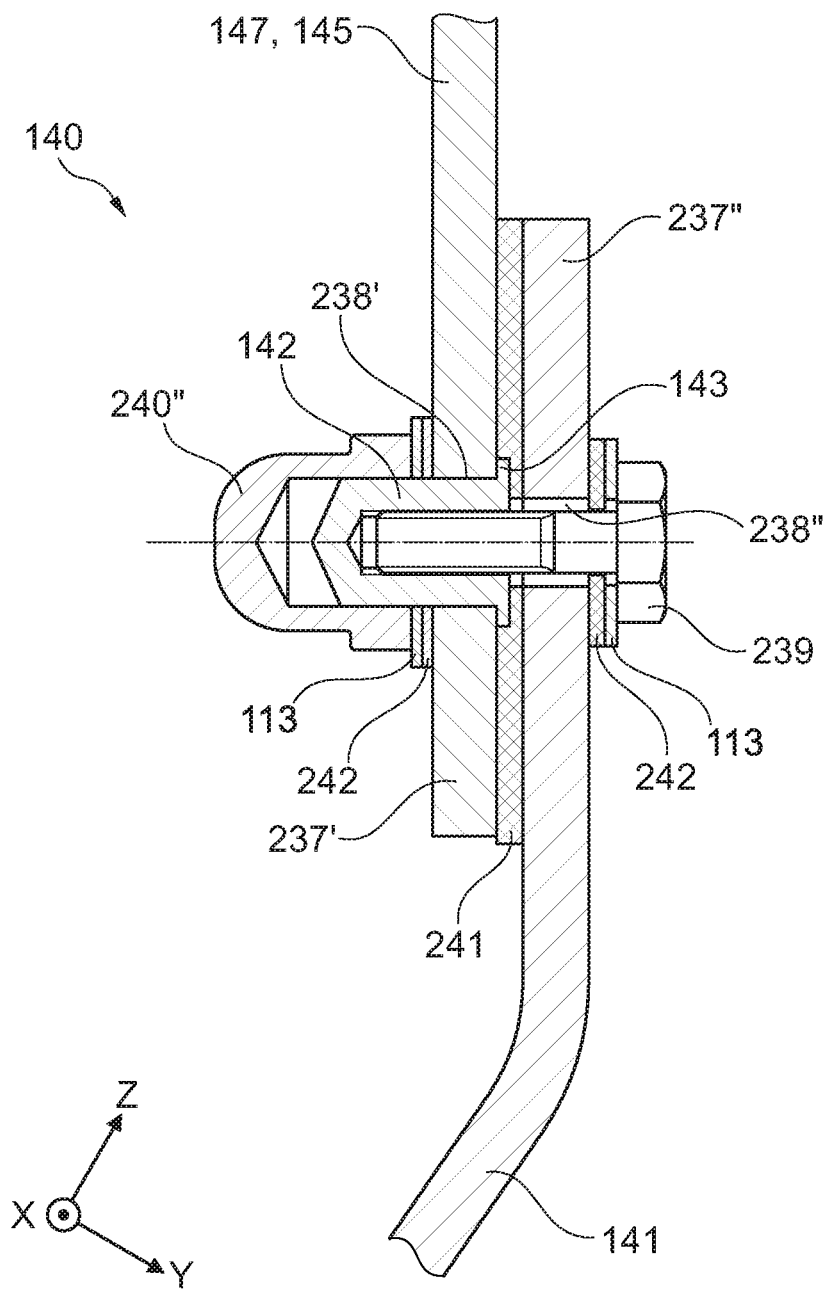
Figure 10:
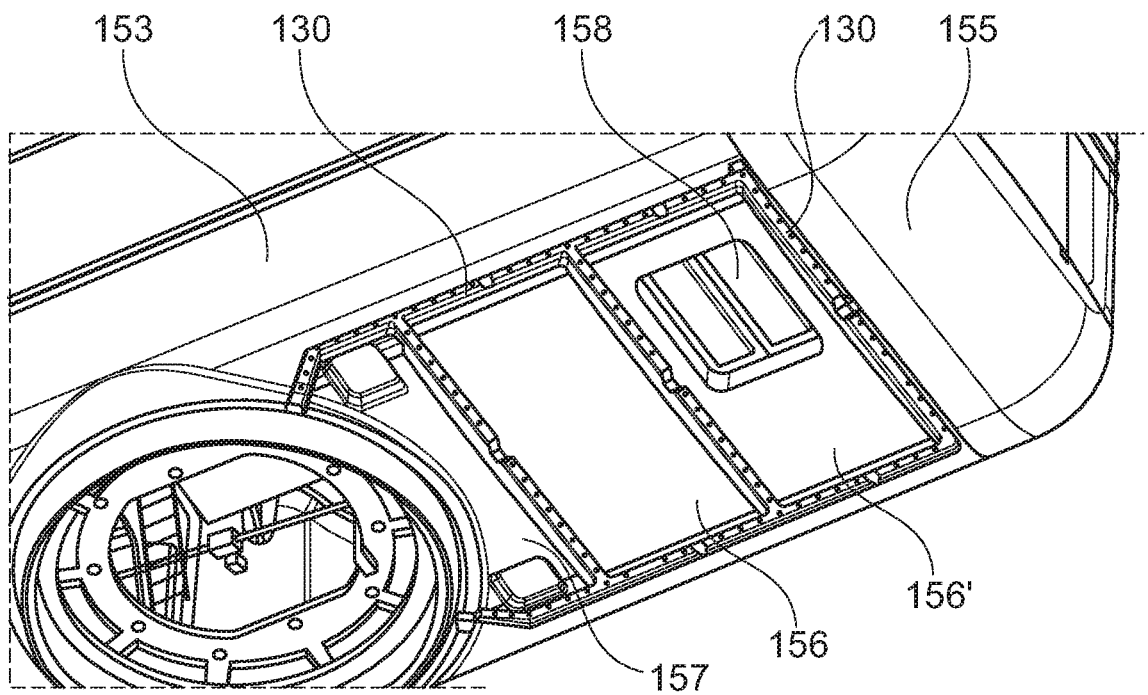
Figure 11:
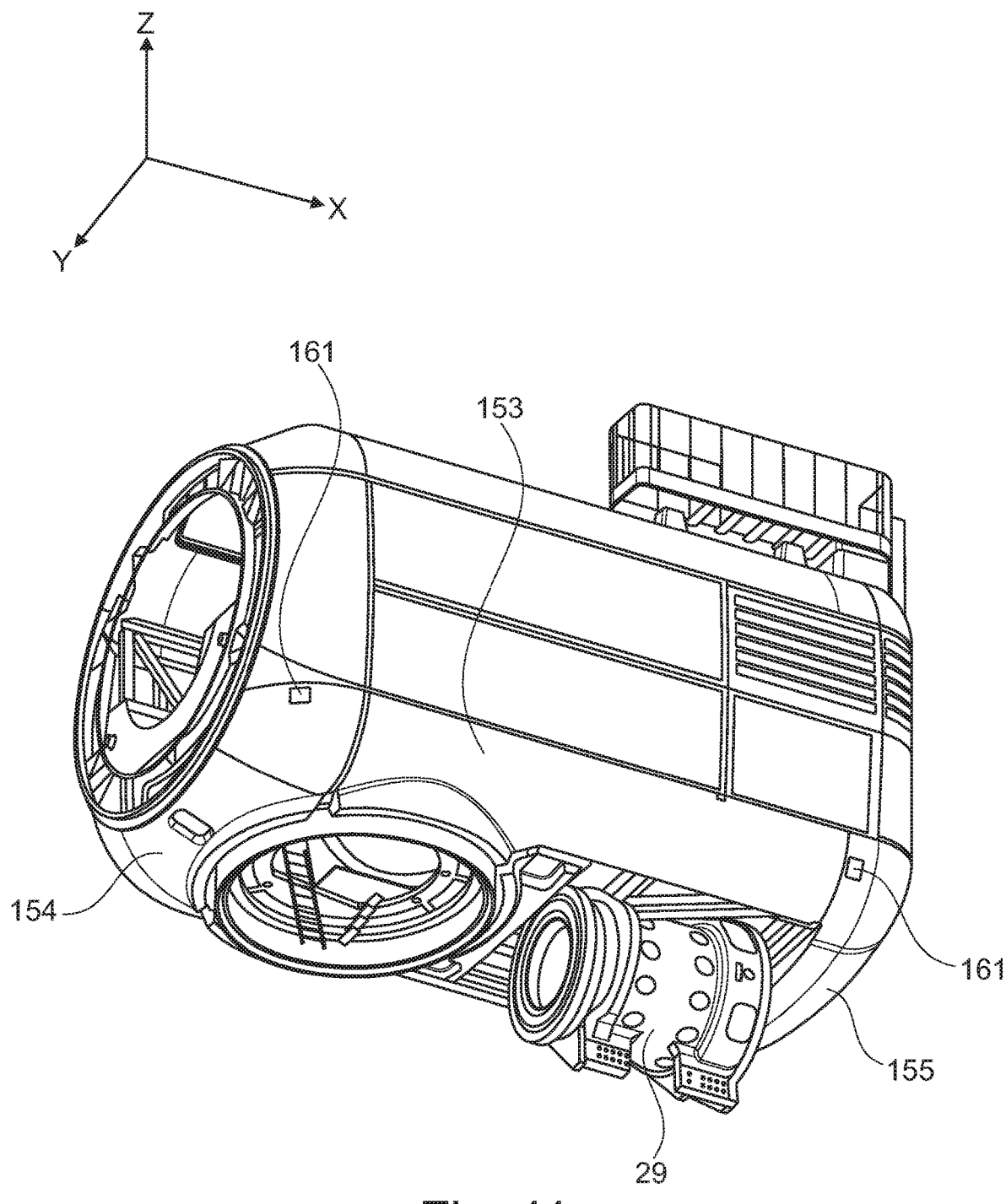

FIG. 8 is a simplified cross-sectional view of a flange connection 130 attaching inner bottom panels 133 to outer bottom panels 136 of the nacelle;

FIG. 9 is a simplified cross-sectional view of a flange connection attaching a hatch cover to a cover panel;

FIG. 10 is a simplified perspective bottom view of a nacelle bottom having detachable inner bottom cover panels; and FIG. 11 is a simplified perspective bottom view of a nacelle bottom having the inner bottom cover panels removed in order to winch up/down a main shaft assembly of the wind turbine.

DETAILED DESCRIPTION

Figure 1:
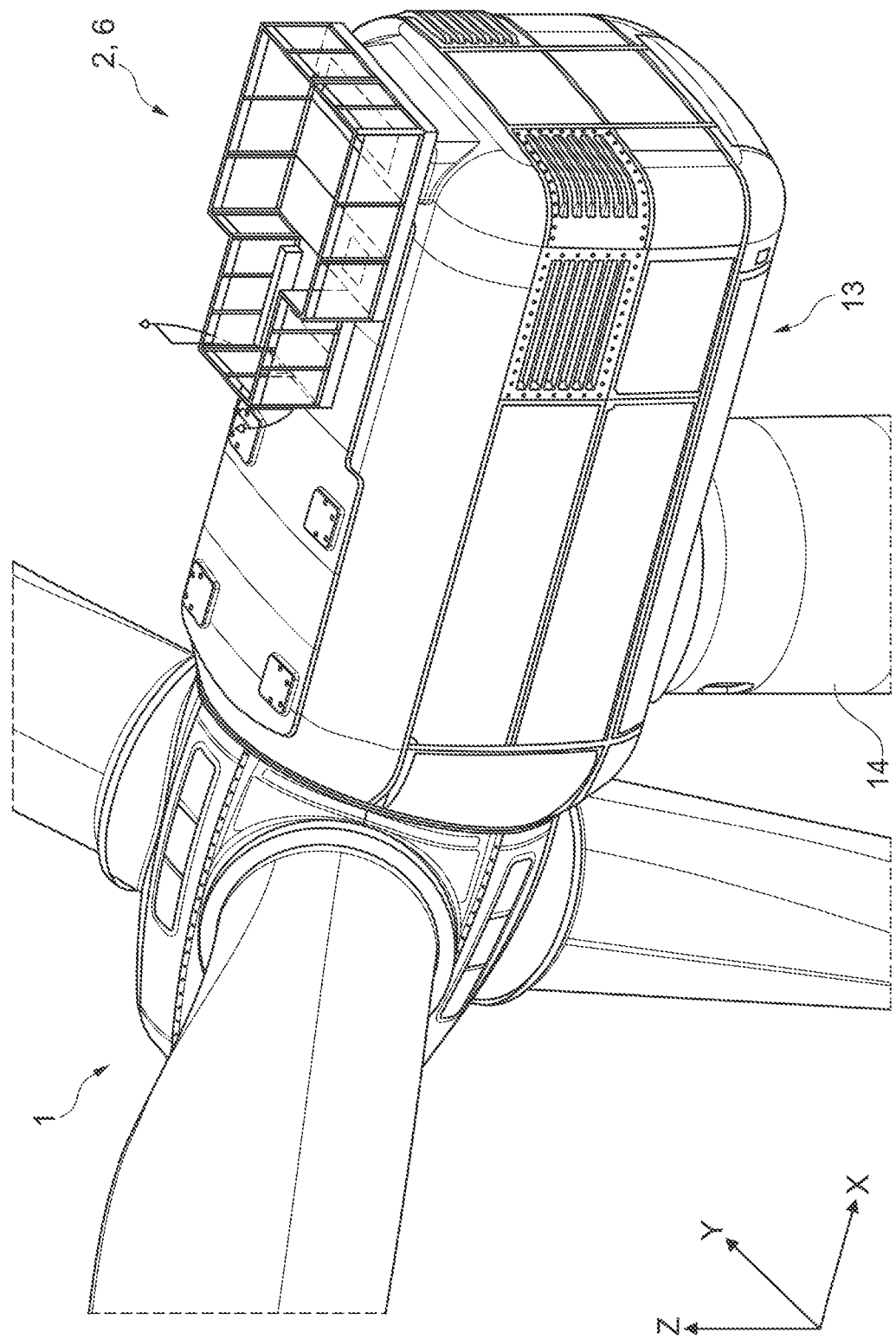
FIG. 1 is a simplified perspective view of a wind driven power plant having a nacelle comprising a nacelle bottom cover.

FIG. 1 shows a simplified perspective view of a wind driven power plant 1. The wind driven power plant 1 comprises a nacelle 2. The nacelle extends in a vertical direction Z, which is substantially parallel to the axial extension of a supporting structure, in particular a tower 14 on which the nacelle 2 can be mounted. The nacelle 2 also extends in a horizontal plane defined by a longitudinal direction X, which is substantially parallel to a drive train to be located in the nacelle, and a transversal direction Y. The longitudinal direction X and the transversal direction Y are both perpendicular to the vertical direction Z and to each other.

The nacelle 2 comprises a nacelle cover 6, which can also be considered an envelope (outer shell) of the nacelle. A portion of the nacelle cover 6 is formed by a nacelle bottom cover 13.

The nacelle cover 6 is coupled to a support frame 15. More particularly, lateral side walls 9, 10 of the nacelle cover 6 are coupled to the support frame 15. A nacelle roof 7 and the nacelle bottom cover 13 may also be coupled to the support frame 15. Thereby, the nacelle cover is directly or indirectly laterally supported by the support frame 15.

Figure 2:
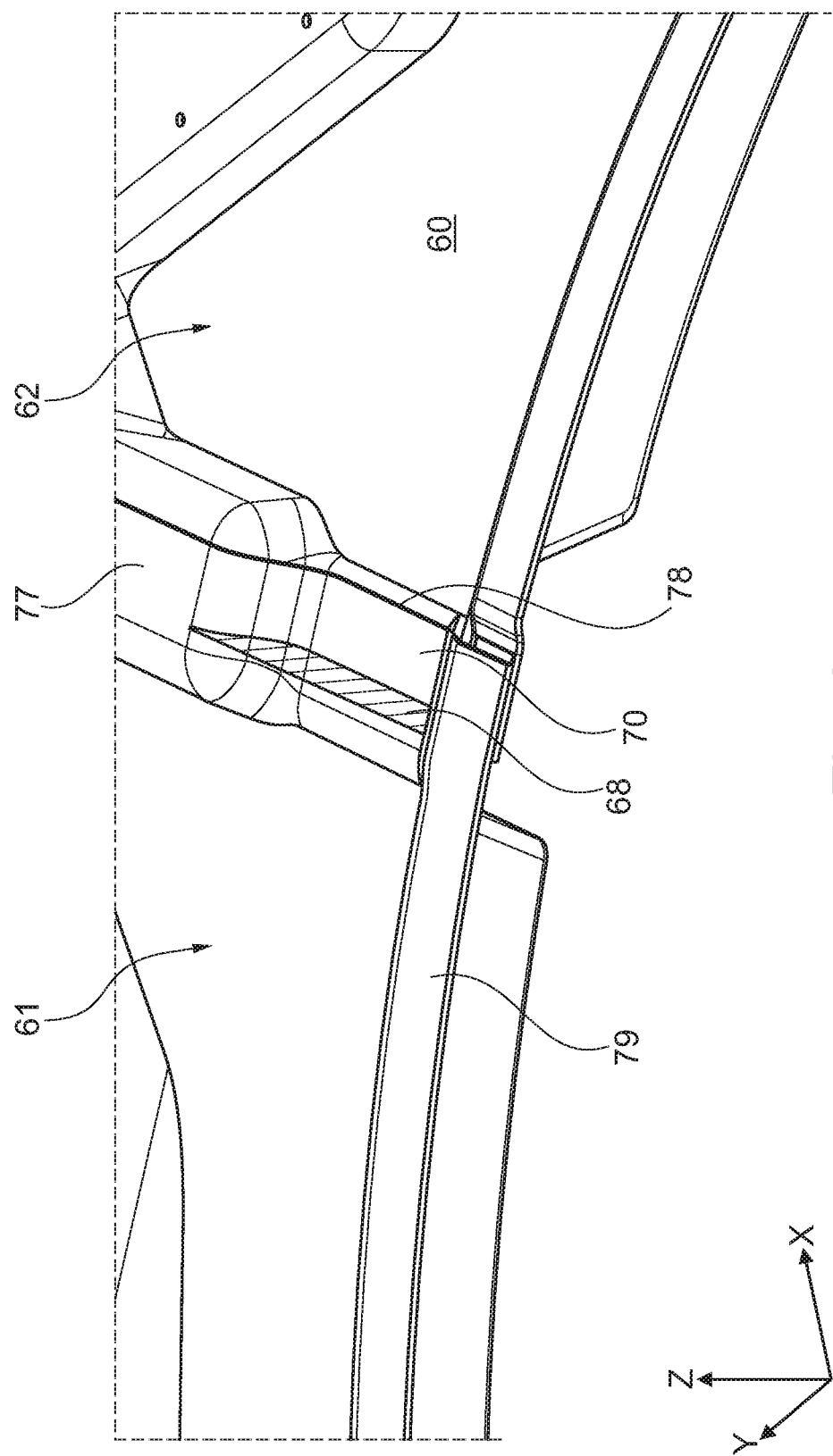
FIG. 2 is a simplified perspective view of a first and a second segment of the nacelle bottom cover.

FIG. 2 shows a simplified perspective view of two segments 61, 62 of the nacelle bottom cover 13, a first segment 61 and a second segment 62. The depicted nacelle bottom cover 13 comprises more than two segments 61, 62, however.

Each of the segments 61-67 is configured to contain a predefined maximum volume of a leaking liquid 60 in a corresponding receptacle (the same reference numbers generally apply to the segments and the corresponding receptacles, unless stated otherwise). The respective receptacles are configured to collectively contain a total volume that corresponds to a total amount of liquids in the wind driven power plant. Advantageously, the receptacles are configured to even contain the total volume, if the nacelle 2 is in a slightly tilted position (approximately +/−2°), e.g. because of constructional tolerances or wind load.

The first segment 61 is arranged adjacent to the second segment 62.

The first segment 61 and the second segment 62 are conditionally coupled by a (first) channel 68 that is configured to distribute the leaking liquid 60 from the first segment 61 to the second segment 62, in case the amount of leaking liquid in the first segment 61 exceeds the predefined volume of the first segment 61.

Figure 3:
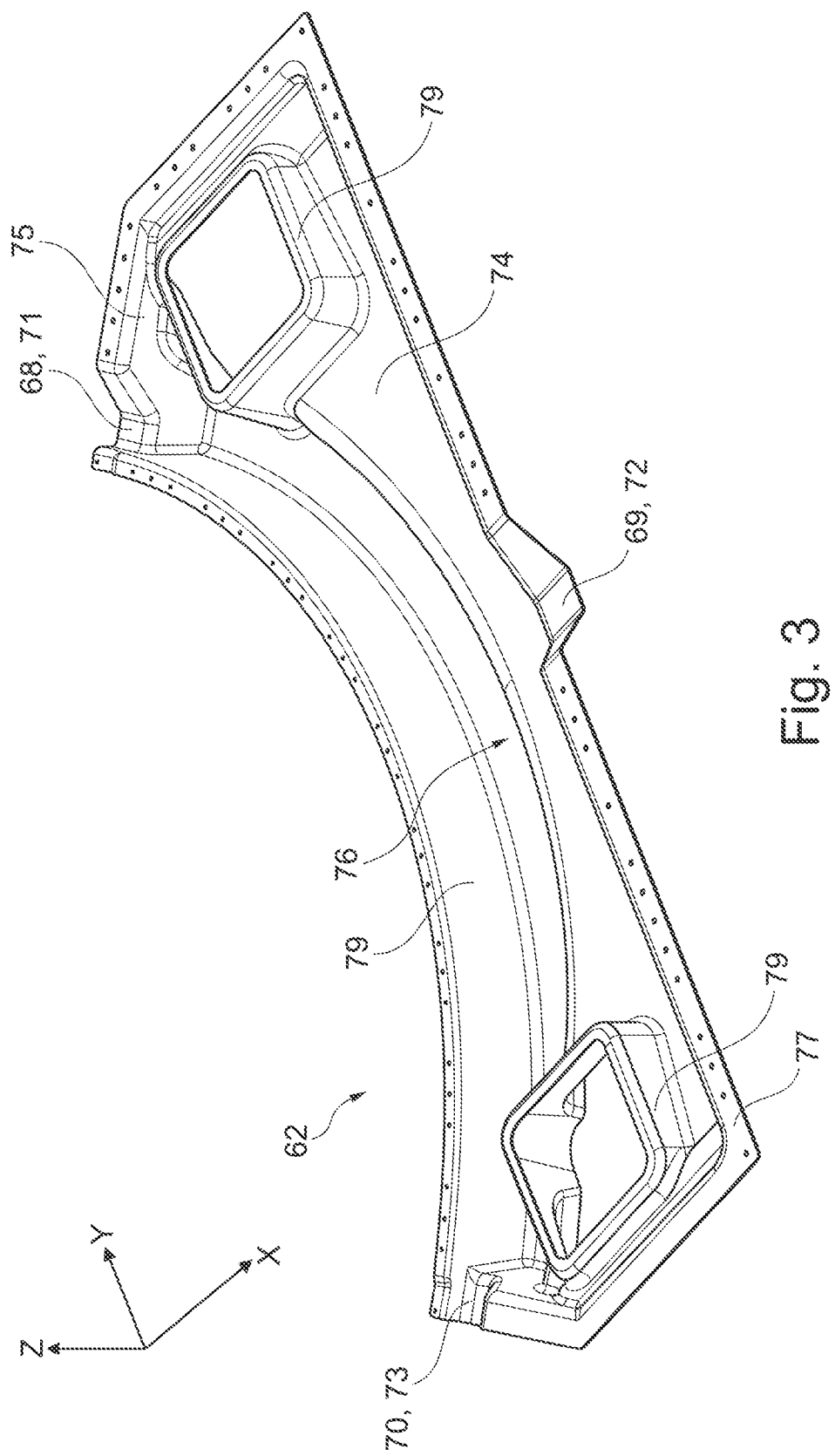
FIG. 3 is a simplified perspective view of the second segment of the nacelle bottom cover.

FIG. 3 shows a simplified perspective view of the second segment 62 (or rather a panel of the nacelle bottom cover that comprises the second segment 62) without any liquids. The segments 61-67 each comprise a lower surface 74 and a circumferential upraised surface 75 that surrounds the lower surface 74. The lower surface 74 and the circumferential upraised surface 75 cooperatively form the receptacle 76.

The circumferential upraised surface 75 is configured to provide additional structural stiffness to the segments.

A section of the circumferential upraised surface 75 forms the channel 68-70. A bottom 71-73 of the channel has a lower vertical height (in direction of the Z-axis) than the remainder of the circumferential upraised surface 75. The vertical height of the bottom 71-73 of the channel 68-70 defines a maximum fill-level of the receptacle 76.

As the panels of this embodiment comprise exactly one corresponding segment each, the same reference numbers are used to refer to the segments 61-67 and the respective panels 61-67. However, a panel can alternatively comprise more than one segment (embodiment not shown).

Each composite panel is manufactured as a wide span self-support composite panel. The panel can be configured as a typical sandwich lamination. In this case, each panel comprises top and bottom fiberglass layers and can optionally comprise a middle foam core. If such a core is implemented, this enhances the stability of the panel.

Resin infusion is utilized during the lamination process. In a one-shot resin infusion process, the resin is distributed in a uniform manner across the layup. Subsequently, bonding the complete layup in one manufacturing step is possible.

A vacuum infusion process (VIP) or a light resin transfer molding (light RTM) process can be used to manufacture the segments/panels.

Panels 61-67 with segments 61-67 comprise a flange 77 to form an overlapping flange connection with at least one adjacent panel. The respective circumferential upraised surface 75 of the panel 61-67 forms at least a part of the respective flange 77.

Each of the flanges 77 is integral to one of the panels. The flanges 77 advantageously extend in the same plane as the panel to which it belongs or at least in substantially the same plane as the region of the panel adjacent to the flange. In other words, the respective flange 7 extends essentially straightly (not bent or curved) from the adjacent region of the panel in at least one direction.

The panels are configured such that a flange gap 78 (see FIG. 2) between two overlapping flanges 77 of a flange connection is generally positioned above maximum fill-levels of one or more receptacles 61-67 adjacent to the (intermediate) flange connection.

The flange gap 78 is sealed by a seal/gasket. In the area of the channels, the flange gap is further sealed with a sealing compound that is substantially inert to the liquids in the wind driven power generator 1. The sealing compound protects the gasket in the flange gap 78 from potentially aggressive leaked liquids, in case the flange gap of the channel bottom 71-73 becomes submerged.

The panels can be made of a composite, i.e. a glass fiber reinforced polymer (GFRP).

Figure 4:
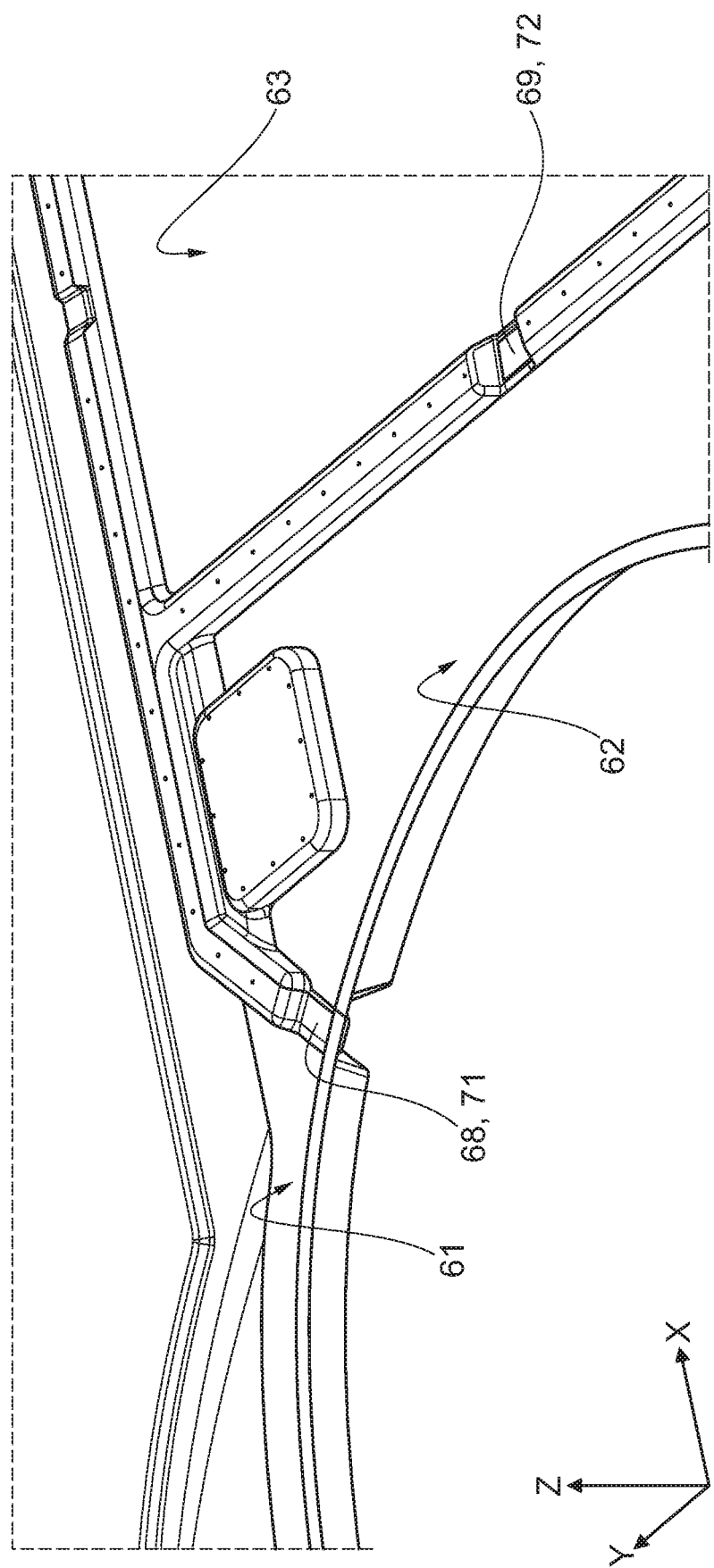
FIG. 4 is a simplified perspective view of the first, second and a third segment of the nacelle bottom cover.

FIG. 4 shows a simplified perspective view of the nacelle bottom cover 13 comprising a third segment 63. At least the second segment 62 comprises a first channel 68 and a second channel 69. The first channel 68 is coupled to the first segment 61. The second channel 69 is coupled to the third segment 63. The channel bottom 72 of the second channel 62 can have a lower (alternatively: higher or same) vertical height than the channel bottom 71 of the first channel 61. All channel bottoms 71-73 of a segment 61-67 can have the same or different vertical heights. The vertical heights, the area/position of the leakage in the nacelle 2 and the volume of the leaking liquid 60 determine the sequence of filling of the receptacles 61-67.

Figure 5:
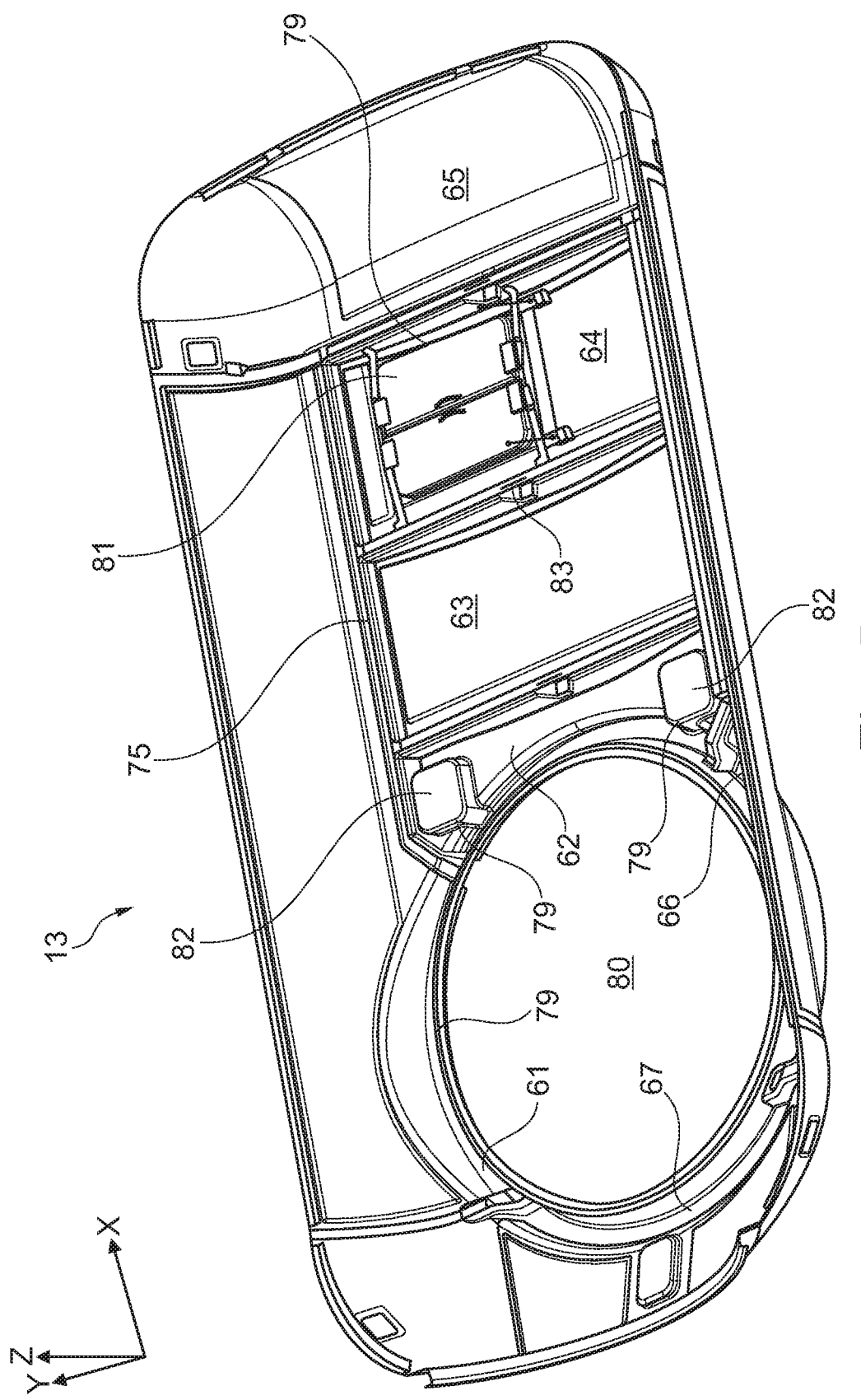
FIG. 5 is a simplified perspective view of the nacelle bottom cover.

FIG. 5 shows a simplified perspective view of the nacelle bottom cover 13 of the nacelle 2. A plurality of panels 61-67 forms the nacelle bottom cover 13.

Adjacent segments 61-67 are coupled by channels such that they are consecutively filled one after the other with the leaking liquid 60.

One or more of the panels 61-67 form a raised collar 79 that surrounds an opening in the nacelle bottom cover 13. In particular, the opening can be a tower opening 80 or a hatch opening 81, 82. The raised collar rises above the maximum fill-level of the receptacles.

The liquid retainment segments (or rather the panels comprising the segments) are manufactured as one-shot composite reinforced laminates.

Advantageously, some or all segments (or rather the panels comprising the segments) can have a sandwich structure. The sandwich structure comprises a fiber reinforced top layer, a fiber reinforced bottom layer and an intermediate foam core.

Flange regions and/or collar regions of the segments/panels comprise a single skin laminate.

In other words: The composite layup of the panels varies between sandwich and single skin areas, wherein the larger surface is reinforced with core foam, and the upraised and overlap flanges are a single skin lamination without foam core.

The nacelle bottom cover 13 is configured to be removable and detachable at least in a center section such that parts of the drive train can be lowered down and outside the nacelle. As such, the panels 63 and 64 can be configured as a sealed removable and detachable lid.

The term "detachable" in this context should be understood to describe panels 63, 64 that can be fully detached from the remaining part (e.g. the outer bottom cover panels 61, 65, 66 and 67) of the nacelle 2 in an easy and convenient way. As such, removable and detachable panels 63, 64 are configured to be physically lifted away from the nacelle 2, e.g. by a lifter or crane, or by a helicopter and placed at ground level, e.g. on a jack-up barge. Sliding or revolving panels or roof sections which are not conceived to be easily and conveniently fully detachable from the nacelle 2 are therefore not considered to be removable and detachable within the meaning of this description.

In other words, a detachable connection is configured for repeated engagement and disconnection. The detachable connection is not constructed for single-time and/or permanent (or at least long lasting) engagement.

A permanent connection, on the other hand, is configured for single-time and/or permanent (or at least long lasting) engagement. Stated differently, the permanent connection is not constructed for a recurring engagement and disconnection.

For example, a welded connection is obviously considered to be a permanent connection.

A screwed connection, however, can be considered to form a detachable connection as well as a permanent connection, depending on the configuration of the screwed connection and the intended purpose.

A screwed connection comprising a castle nut secured by a safety cotter pin, for example, may be configured for easy and convenient detachment (and reattachment). The same applies to a screwed connection comprising a low-strength liquid bolt retaining compound (such as "Loctite 221", "Loctite 222" or comparable), which may be reapplied after every detachment.

A screwed connection comprising a medium-strength liquid bolt retaining compound (such as "Loctite 243" or comparable) or a high-strength liquid bolt retaining compound (such as "Loctite 270", "Loctite 276" or comparable), however, forms a permanent connection, even if such a connection can still be detached, for example by using solvents, a heat treatment, or special tools. The nacelle bottom cover 13 further comprises two smaller hatches 82 in the inner bottom cover panel 62 next to the tower opening 80.

The segments 62, 64 comprising the hatches 82, 81 have a raised collar 79 around the hatch openings. As the panels are manufactured comprising a composite laminate, several further considerations regarding the manufacture of the flange connections have to be made.

Figure 6:
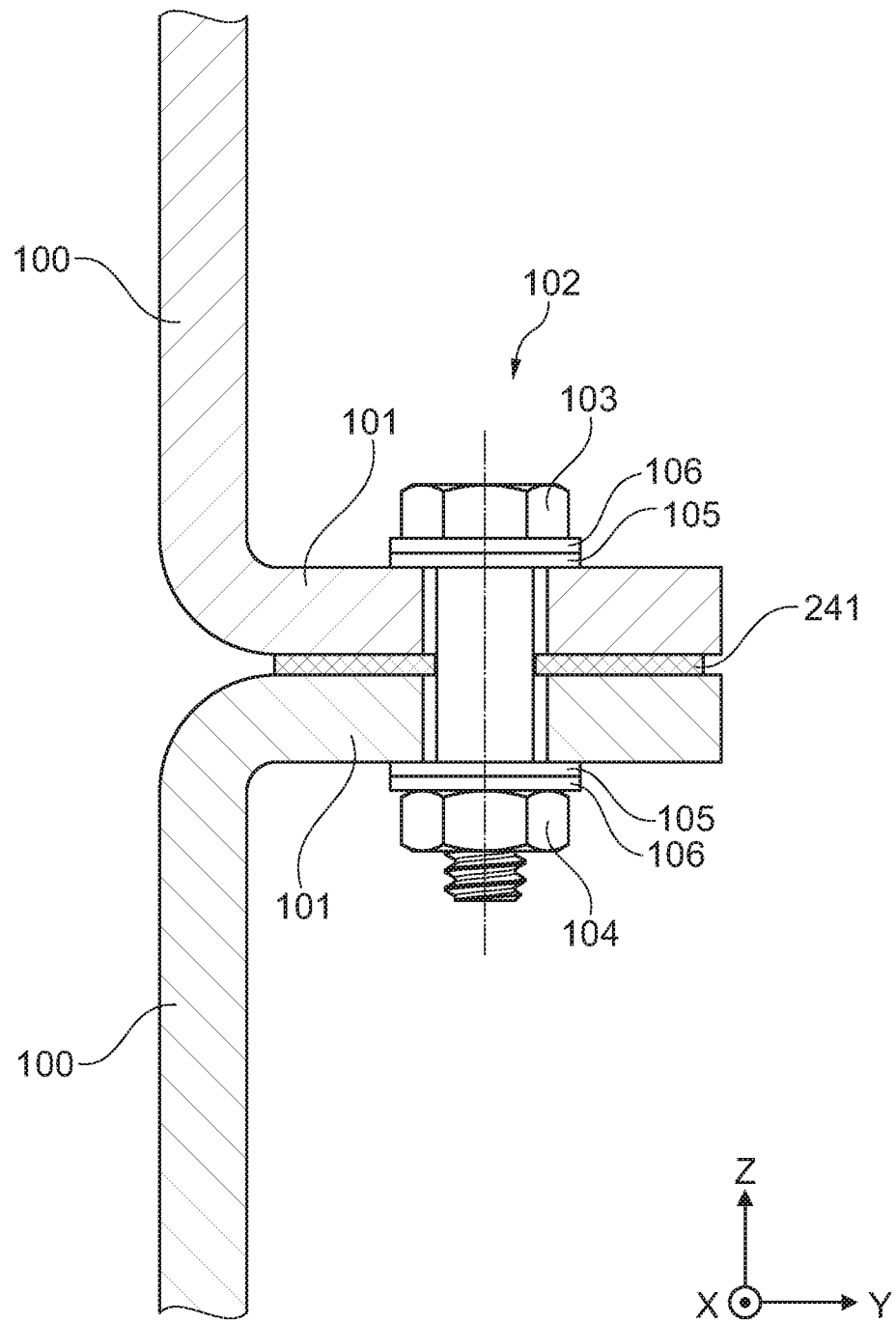
FIG. 6 is a simplified cross-sectional view of a flange connection of two nacelle cover panels 100.

FIG. 6 shows a simplified cross-sectional view of a flange connection of two nacelle cover panels 100, according to the known art. Flanges 101 extend perpendicularly from the panels 100. The flanges 101 are connected by a bolted (screwed) connection 102 on the in inside of the nacelle. This provides that the bolt 103 and the nut 104 are both accessible from inside the nacelle. The bolted connection may comprise additional washers 105 (i.e. optional elastomeric washers for sealing and/or spring washers) and metallic washers 106. Advantageously, due to the configuration of the flanges 101, the bolted assembly 102 on the inside of the nacelle is well protected from environmental effects outside the nacelle.

Figure 7:
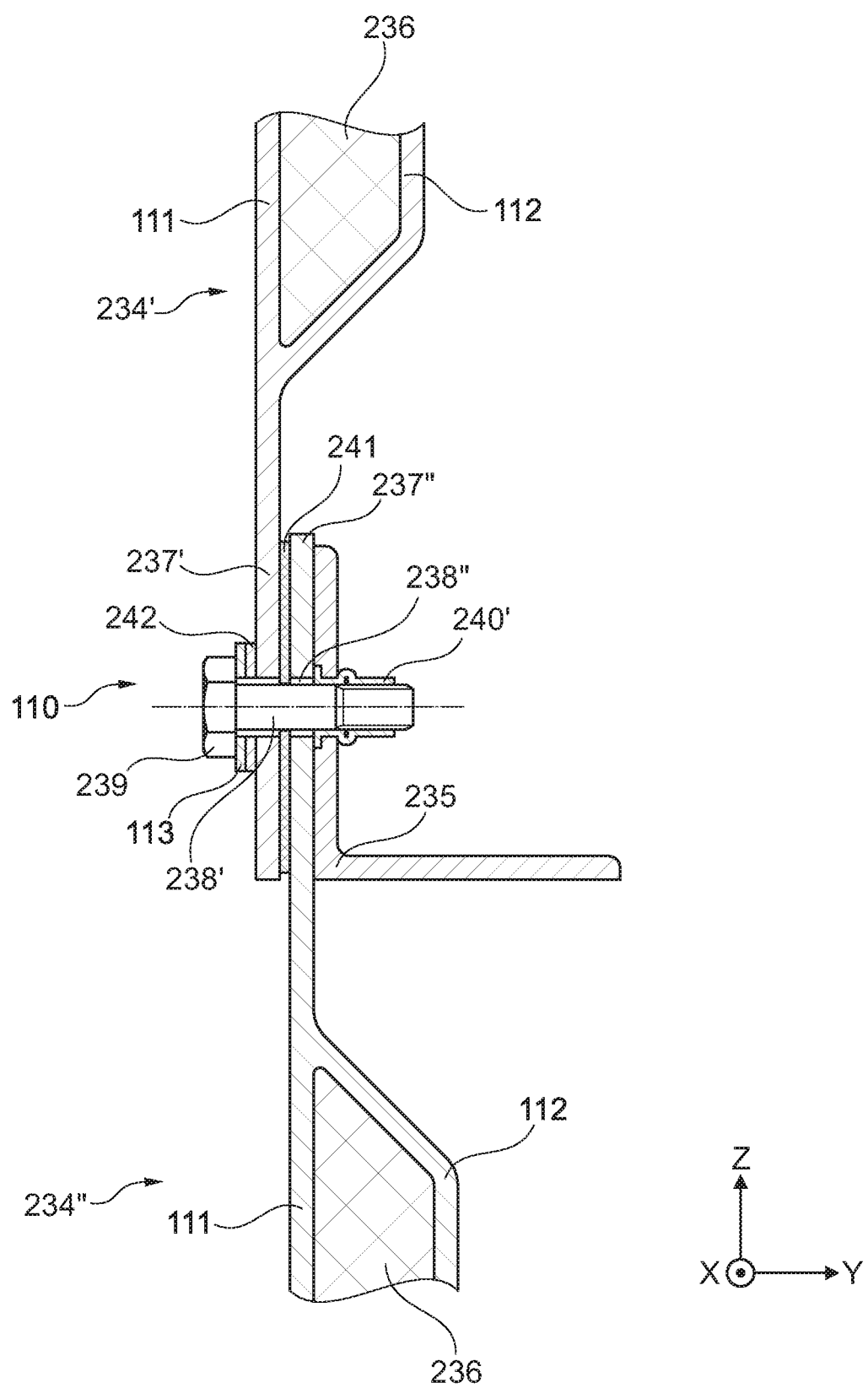
FIG. 7 is a simplified perspective cross-sectional view of an exemplary flange connection 110 of two overlapping nacelle cover panels 234.

FIG. 7 shows a simplified perspective cross-sectional view of an exemplary flange connection 110 of two overlapping nacelle cover panels 234 according to an aspect of embodiments of the invention. This flange connection is also referred to as a flange connection of a first type. The first type is advantageously used for the lateral and/or rear sides of the nacelle cover 6, i.e. for vertically extending sides and panels. The nacelle panels 234 are made of a composite, in particular a glass fiber reinforced polymer (GFRP).

Each composite panel 234 is manufactured as a wide span self-support composite panel. The panel 234 is configured as a typical sandwich lamination. Each panel 234 comprises an outer side fiberglass layer 111 and an inner side fiberglass layer 112. The panels 234 can optionally comprise a middle foam core 236 in-between the outer side fiberglass layer 111 and the inner side fiberglass layer 112. The foam core 236 can be configured to form reinforcement ribs in the panel 234. Alternatively, the foam core 236 can be a global foam core 236, i.e. spanning a major part of the panel 234. The foam cores 236 are covered by the outer side and inner side fiberglass layers 111, 112 and enhance the stability of the panel 234.

Resin infusion is utilized during the lamination process. In a one-shot resin infusion process, the resin is distributed in a uniform manner across the layup. Subsequently, bonding/curing the complete layup can be conducted, e.g. in an autoclave. Accordingly, a majority or all the composite panels of the nacelle are manufactured in a one-shot lamination/manufacturing step.

The panels 234 are connected to each other by means of overlapping flanges 237. Each of the flanges 237 is integral to one of the panels 234. The flanges 237 advantageously extend in the same plane as the panel 234 to which it belongs or at least in substantially the same plane as the region of the panel 234 adjacent to the flange 237. In other words, the respective flange 237 extends essentially straightly (not bent or curved) from the adjacent region of the panel 234.

The split line between the panels 234', 234" of the nacelle cover 6 extend in flat planes perpendicular to the surface of the panels and along the flange connection 110 between the panels 234', 234" (here in direction X).

The arrangement of the panels of the nacelle cover in general, and in particular of the overlapping flanges 237, is based on a high-point drainage concept. This means that the flange 237' of the top panel 234' of a flange connection 110 having a higher altitude (greater level) spans/overlaps the flange 237" of the complementary bottom panel 234" (the bottom panel 234" having a lower altitude) on an outer surface of the nacelle in a downward direction. Hence, the arrangement of the overlapping flanges 237', 237" advantageously exploits gravitational forces which determine the water flow direction in order to keep water from flowing into the nacelle.

The drillings 238 (drill holes) for the flange connection 110 are applied after the manufacturing process of the composite panels 234, i.e. after curing and/or autoclaving the panels 234. Drilling of the drill holes can be conducted after the respective panels 234', 234" are adjusted to each other, or alternatively by using a drilling template or a CNC-guided drilling machine. With this procedure, the accuracy of fit of corresponding drillings 238', 238" in the flanges 237 of both respective panels 234 is advantageously ensured.

According to an aspect, specialized threaded bolts 239 and nuts 240 are used. Either a (clinch) bolt 239' or a (clinch/rivet) nut 240' is pressed (clinched, riveted) into a reinforcing metal beam 235 that is part of the flange connection 110. Given this procedure, the attached threaded bolt 239' or nut 240' is fixed in position and is not rotatable. The complementary nut 240 or bolt 239 used to tighten the connection joint can accordingly be applied from the inside or outside of the nacelle, depending on the configuration (the flange connection 110 being a permanent connection or a detachable connection). Generally, a detachable flange connection should be accessible at least from inside the nacelle. No access to the joint is necessary from the outside which advantageously decreases the risk during assembling or maintaining the nacelle. A permanent flange connection 110 may be operated (loosened/disengaged, tightened/engaged) from inside or the outside the nacelle, depending on accessibility of the flange connection.

In this embodiment, a rivet nut 240' is riveted to the metal bar 235 on the inside. The bolt 239 is screwed into the rivet nut 240' from the outside.

The flange connection 110 is reinforced by profiled metal bars 235 (metal beams), which can be arranged adjacent to the flanges 237 (and extending along the split line), thereby becoming a part of the flange connection 110. The metal bars 235 can, for example, exhibit a flat bar shape and/or an "L"-shape (as shown). The metal bars 235 are mounted to the connection joints to stabilize the flange connection. Furthermore, the "L"-shaped metal bars 235 are further used and configured to mount the composite panels 234 to the lateral sections of the framework structure of the support frame. Adjustable brackets can be coupled to the L-shaped or angular metal bars 235 and the support frame, i.e. the beams or truss members of the outer support frame.

The metal bars 235 can be arranged and conductively interconnected such that they form a faraday cage to provide a lightning protection of the drive train and other components.

Between the panels 234 a sealing 241 is applied and provides water and air tightness of the flange connection 110. Water and air tightness generally refers to a liquid/fluid ingress protection under environmental conditions the nacelle is exposed to. Moreover, sealing paste can be used to tighten the drill holes 238', 238" with respect to water and air. A liquid bolt retaining compound (also: liquid screw retention or liquid screw locking) can protect the screwed connection of the bolt 239 and the nut 240 against undesired loosening. An elastomeric (rubber/silicone) washer 242 is applied between a steel washer 113 and the flange 237.

The flange connection 110 is configured to be a substantially maintenance free connection, having an expected/calculated lifetime of approximately twenty-five years.

In short, the flange connection 110 comprises (from outside to inside of the nacelle) a bolt 239 extending through a metal washer 113, an elastomeric washer 242, a drill hole 238' in the outer/top panel 234', an elastomeric sealing 241, a drill hole 238" in the inner/bottom panel 234", and a rivet nut 240' riveted into a hole of a profiled metal bar 235. The bolt 239 is screwed into the rivet nut 240' from the outside.

The concept of planar flange connections 110 in combination with the high-point drainage concept has surprisingly proven to be more robust and easier to maintain than the known art flange connections 100.

FIG. 8 is a simplified cross-sectional view of a flange connection 130 attaching inner bottom panels 133 to outer bottom panels 136 of the nacelle. This flange connection is also referred to as a flange connection of a third type. The third type is advantageously used for the bottom panels, in particular for connecting the inner bottom panels 133 to the outer bottom panels 136. The configuration/construction of the panels, more specifically the inner bottom panels 133 and outer bottom panels 136, is substantially comparable/similar to the panels 247, 243 of the nacelle roof.

Each panel 133, 136 comprises an outer side fiberglass layer 111 and an inner side fiberglass layer 112. The panels 133, 136 can optionally comprise a middle foam core 236 in-between the outer side fiberglass layer 111 and the inner side fiberglass layer 112. The foam core 236 can be a global foam core 236, i.e. spanning over a major portion of the panels 133, 136. The foam cores 236 are covered by the outer side and inner side fiberglass layers 111, 112 and enhance the stability of the panels 133, 136.

The panels are connected to each other by means of overlapping flanges 237. Each of the flanges 237', 237" is integral to one of the panels 133, 136. The flanges 237 advantageously extend in the same plane as the panel 133, 136 to which it belongs, or at least in substantially the same plane as the region of the panel adjacent to the flange 237.

The split line between the panels 136, 133 of the nacelle cover 6 extend in flat planes perpendicular to the surface of the panels and along the flange connection 130 between the panels 136, 133 (here in direction X).

The arrangement of the panels of the nacelle cover in general, and in particular of the overlapping flanges 237', 237" and the inner and outer bottom panels 133, 136 in the bottom of the nacelle, is based on the high-point drainage concept.

The inner bottom panels 133 are configured to be detachable panels. The inner bottom panels 133 cover/span the opening between the outer bottom panels 136 from the outside.

With regard to the high-point drainage concept, this means that the outer bottom panels 136 comprise a(n outer) drip edge 131 that has a substantially lower level than the flange connection 130.

In other words, the flange connection 130 according to this embodiment is located in an indentation with respect to a surrounding surface of the adjacent panels 133, 136. This kind of flange connection is advantageously used at the bottom of a nacelle. The flange connection does then have greater height (altitude) than the surrounding panels which improves water tightness.

The drill holes 238 for the flange connection 130 are applied after the manufacturing process of the composite panels 133, 136.

Either a bolt 239' or a nut 240' is pressed into a reinforcing metal beam 235 that is part of the flange connection 130. The attached threaded bolt 239' or nut 40' is therefore fixed in position and not rotatable. The complementary nut 240 or bolt 239 used to tighten the connection joint can accordingly be applied from the inside or outside of the nacelle, depending on the configuration (the flange connection 130 being a permanent connection or a detachable connection). Generally, a detachable flange connection should be accessible from inside the nacelle. A permanent flange connection 130 may be operated (loosened/disengaged, tightened/engaged) from inside or the outside the nacelle, depending on accessibility of the flange connection.

In this embodiment, a rivet nut 240' is riveted to the lower metal beam 235". A bolt 239 is screwed into the rivet nut 240' from the inside to tighten the detachable flange connection 130.

The flange connection 120 is reinforced by profiled metal bars 235', 235" on the inside and the outside of the nacelle adjacent to the top flange 237' and the bottom flange 237", respectively. The metal bars are substantially "L-shaped having an obtuse angle (shown) or alternatively have a flat bar profile (not shown). The metal bars 235', 235" substantially sandwich the flanges 237', 237" of the panels 136, 133 in-between. The metal bars 235', 235" extend along the split line between adjacent panels. The metal bars 235', 235" are a part of the flange connection 130.

The metal bars 235 can be arranged and conductively interconnected such that they form a faraday cage to provide a lightning protection of the drive train and other components.

Between the panels 136, 133 a sealing 241 is applied and provides water and air tightness of the flange connection 130.

Moreover, sealing paste can be used to tighten the drill holes 238', 238" with respect to water and air. A liquid bolt retaining compound can protect the screwed connection of the bolt 239 and the rivet nut 240' against undesired loosening. The flange connection 130 further comprises a steel washer 113 (and/or a spring washer) between the inside metal bar 235' and the bolt 239.

The flange connection 130 can be configured to be a substantially maintenance free connection.

In short, the flange connection 130 comprises (from inside to outside of the nacelle 2) a bolt 239 extending through a metal washer 113 and a hole of the inside metal bar 235', the bolt 239 further extending through a drill hole 38' in the top flange 237' (of the outer bottom panel 136), an elastomeric sealing 241, a drill hole 238" in the bottom flange 237" (of the inner bottom panel 133), and a rivet nut 240' riveted into in an outside metal bar 235". The bolt 239 is screwed into the rivet nut 240' from the inside.

The concept of planar flange connections 130 in combination with the high drainage concept has surprisingly proven to be more robust and easier to maintain than the known art flange connections 100.

FIG. 9 is a simplified cross-sectional view of a flange connection 140 attaching a hatch cover 141 (e.g. of a lateral extension arm hatch) to an outer front or rear bottom panel 147, 145. This flange connection is also referred to as a flange connection of the fourth type. The hatch cover 141 can be opened and closed from inside the nacelle.

The panel 147, 145 and the hatch cover 141 are connected to each other by means of overlapping flanges 237. Each of the flanges 237', 237" is integral to one of the panel 147, 145 and the hatch 141, respectively. The flange 237 extends in the same plane as the panel 147, 143.

The hatch cover 141 covers/spans the opening in the outer front/rear bottom panel 147, 145 from the inside.

The drill holes 238 for the flange connection 130 are applied after the manufacturing process of the composite panels 147, 145, 141.

A bushing 142 having a male (outer) threading at an outer surface and a female (inner) threading at an inner surface comprises (in axial direction of the threading) a thin end and a thickened end comprising a collar 143. The bushing 142 is inserted—thin end first, thickened end last—from inside to outside the nacelle through a drill hole 238' in the outside flange 237'. A cap nut 240" is screwed onto the male threading of the bushing 142 from the outside. The cap nut 240" and outside flange 237' sandwich a steel washer 113 and an elastomeric washer 242 in-between. The steel washer 113 is positioned adjacent the cap nut 240", the elastomeric washer 242 between steel washer 113 and outside flange 237'. There is a sealing 241 positioned adjacent to the outside flange 237' of the outer (bottom) panel 147, 145 and sandwiched between the outside flange 237' and the inside flange 237". A bolt 239 extends (from the inside) through a steel washer 113, an elastomeric washer 242, a hole in the inside flange 237", and the sealing 241. The bolt 239 is screwed into the female threading of the bushing 141.

Moreover, sealing paste can be used to tighten the drill holes 238', 238" in the flanges 237', 237" with respect to water and air. A liquid bolt retaining compound can protect the screwed connection of the cap nut 240" and the bushing 142, and the bolt 239 and the bushing 142 against undesired loosening.

The flange connection 130 can be configured to be a substantially maintenance free connection.

In short, the flange connection 130 comprises (from inside to outside of the nacelle) a bolt 239 extending through a metal washer 113 and an elastomeric washer 242. The bolt 239 further extends through a drill hole 238" in the inside flange 237" (of the hatch cover 141), an elastomeric sealing 241, into a bushing 142. The bushing extends through a hole 238' in the outside flange 237', an elastomeric washer 242, a steel washer 113 and into the cap nut 240". The bolt 239 is screwed into the bushing 142, and the bushing 142 is screwed into the cap nut 240".

The concept of planar flange connections 140 provides an air and watertight hatch cover that can be operated from inside the nacelle.

FIG. 10 shows a simplified perspective bottom view of a nacelle bottom having detachable inner bottom cover panels 156. The bottom cover of the nacelle 2 comprises outer lateral bottom panels 153, 136, an outer rear bottom panel 155, 136, detachable inner bottom panels 156, 133 and a fixed inner bottom panel 157, 133. An inner bottom panel 156' comprises a bottom hatch 158 for hoisting supplies from/to the nacelle 2. The bottom hatch 158 comprises double wing doors, which are supported by gas springs and open in an inward direction.

FIG. 11 is a simplified perspective bottom view of a nacelle bottom having the inner bottom cover panels 156 removed in order to winch up/down a main shaft assembly 29 of the wind turbine 1. Depending on the size of the winched component, it may be necessary to temporarily remove detachable trusses 16" of the inner support frame 19, to allow the winched component 29 being allowed to pass through the bottom/lower passageway.

The outer front/rear bottom panels 154, 155 comprise extension arm hatches 161, which can be removed for extending extension arms (not shown) through the extension arm hatches.

Embodiments

1. A nacelle for a wind driven power plant, the nacelle comprising a nacelle bottom cover, wherein the nacelle bottom cover comprises two or more segments, each of the segments being configured to contain a respective predefined maximum volume of a liquid in a receptacle in a case of leakage, and wherein the respective receptacles are configured to collectively contain a total volume that corresponds to a total amount of liquids in the wind driven power plant, in particular a total amount of lubricating oils and/or cooling liquids in the wind driven power plant.

2. The nacelle of embodiment 1, wherein a first segment is adjacent to a second segment and the first segment and the second segment are coupled by a channel being configured to distribute the liquid from the first segment to the second segment, if the amount of liquid in the first segment exceeds the predefined volume of the first segment.

3. The nacelle of embodiment 2, wherein the two or more segments each comprise a lower surface, and a circumferential upraised surface surrounding the lower surface, wherein the lower surface and the circumferential upraised surface form a receptacle, wherein a section of the circumferential upraised surface forms the channel and a bottom of the channel has a lower vertical height than the remainder of the circumferential upraised surface thereby defining a maximum fill-level of the receptacle.

4. The nacelle of embodiment 3, comprising a third segment, wherein at least the second segment comprises a first and a second channel coupled to the first and the third segment respectively, wherein the channel bottom of the second channel has a lower vertical height than the channel bottom of the first channel.

5. The nacelle of anyone of the preceding embodiments, wherein a plurality of panels forming the nacelle bottom cover respectively comprise one or more of the segments, wherein adjacent segments are coupled by channels such that they are consecutively filled one after the other with leaking liquid.

6. The nacelle of embodiment 5, wherein the panels each comprise a flange to form an overlapping flange connection with at least one adjacent panel, and wherein the respective circumferential upraised surface forms at least a part of the respective flange.

7. The nacelle of anyone of embodiments 5 and 6, wherein the panels are configured such that, in a predefined mounting condition, a flange gap between two overlapping flanges of a flange connection is positioned above maximum fill-levels of one or more receptacles adjacent to the intermediate flange connection.

8. The nacelle of anyone of embodiments 5 to 7, wherein one or more of the panels form a raised collar that surrounds an opening in the nacelle bottom cover and in particular a tower opening, wherein the raised collar raises above the maximum fill-level of the receptacles.

9. The nacelle of anyone of the preceding embodiments, wherein the liquid containment segments are manufactured as one-shot composite reinforced laminates.

10. The nacelle of embodiment 9, wherein flange regions and/or collar regions comprise a single skin laminate.

11. A wind driven power plant comprising the nacelle of anyone of the preceding embodiments.

12. A wind park comprising a plurality of wind driven power plants of embodiment 11.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A nacelle for a wind driven power plant, the nacelle comprising: a nacelle bottom cover, the nacelle bottom cover comprising at least two segments, each of the at least two segments being configured to contain a respective predefined maximum volume of a liquid in a receptacle in a case of leakage, and wherein the respective receptacles are configured to collectively contain a total volume that corresponds to a total amount of liquids in the wind driven power plant, wherein the total amount of liquids includes at least one of a total amount of lubricating oils and cooling liquids in the wind driven power plant, a first segment of the at least two segments being adjacent to a second segment of the at least two segments and the first segment and the second segment being coupled by a channel being configured to distribute the liquid from the first segment to the second segment if the amount of liquid in the first segment exceeds the predefined volume of the first segment, each of the at least two segments comprising a lower surface, and a circumferential upraised surface surrounding the lower surface, the lower surface and the circumferential upraised surface forming the receptacle, and a section of the circumferential upraised surface forming the channel and a bottom of the channel having a lower vertical height than the remainder of the circumferential upraised surface, thereby defining a maximum fill-level of the receptacle, wherein the nacelle comprises a plurality of panels forming the nacelle bottom cover, each panel of the plurality of panels comprising at least one segment of the at least two segments, wherein each panel of the plurality of panels has a flange integral with the respective panel to form an overlapping flange connection with at least one adjacent panel, wherein the flange extends in a same plane as the panel to which it belongs, and the respective circumferential upraised surface forms at least a part of the respective flange,
wherein at least one panel of the plurality of panels forms a raised collar that surrounds a tower opening in the nacelle bottom cover, and wherein the raised collar rises above the maximum fill-level of each receptacle.

2. The nacelle of claim 1, wherein adjacent segments are coupled by channels such that they are consecutively filled one after the other with leaking liquid.

3. The nacelle of claim 2, wherein the panels are configured such that, in a predefined mounting condition, a flange gap between two overlapping flanges of a flange connection is positioned above maximum fill levels of one or more receptacles adjacent to an intermediate flange connection.

4. The nacelle of claim 1, wherein the nacelle comprises a third segment, wherein at least the second segment comprises a first and a second channel coupled to the first and the third segment respectively, wherein a second channel bottom of the second channel has a lower vertical height than a first channel bottom of the first channel.

5. The nacelle of claim 1, wherein the at least two segments are manufactured as one-shot composite reinforced laminates.

6. The nacelle of claim 5, wherein at least one of flange regions and collar regions comprise a single skin laminate.

7. A wind driven power plant comprising the nacelle of claim 1.

8. A wind park comprising a plurality of wind driven power plants of claim 7.

* * * * *